United States Patent [19]

Yamanaka

[11] Patent Number: 4,651,143

[45] Date of Patent: Mar. 17, 1987

[54] SECURITY SYSTEM INCLUDING A DAUGHTER STATION FOR MONITORING AN AREA AND A REMOTE PARENT STATION CONNECTED THERETO

[75] Inventor: Torao Yamanaka, Hyogo, Japan

[73] Assignee: Mitsubishi Denki Kabushiki Kaisha, Tokyo, Japan

[21] Appl. No.: 748,935

[22] Filed: Jun. 26, 1985

[30] Foreign Application Priority Data

Sep. 25, 1984 [JP] Japan ................................ 59-198652

[51] Int. Cl.[4] ........................ G08B 13/00; G08B 1/08; H04N 7/18

[52] U.S. Cl. .................................... 340/691; 340/521; 340/541; 340/825.06; 358/108

[58] Field of Search ............... 340/691, 541, 521, 525, 340/524, 825.06; 358/108, 105

[56] References Cited

U.S. PATENT DOCUMENTS 3,209,342 9/1965 Ward .................................. 340/521
3,925,763 12/1975 Wadhwani et al. ................. 340/521
4,511,886 4/1985 Rodriguez ........................... 358/108

OTHER PUBLICATIONS

CCTV Stops Theft from the Inside Security Distributing & Marketing, Feb. 1984, p. 116.

Definition, Specification and Analysis of Manual Automatic and Supervisory Station Control and Data Acquisition, ANSI/IEEE C37.1-1979, pp. 15, 16, Sec. 4 Typical System Diagrams.

*Primary Examiner*—Glen R. Swann, III
*Attorney, Agent, or Firm*—Bernard, Rothwell & Brown

[57] ABSTRACT

A security system including a television camera for taking a scene of a trespass upon a predetermined region at a site to be monitored, a video recorder for recording the image of the scene taken by the television camera, and a sensor for sensing a trespass and outputting a signal for starting the television camera and the video recorder. The signal output from the sensor for sensing a trespass and the outputs of a plurality of other sensors sensing other conditions at the site to be monitored are transmitted to a monitoring site remote from the site to be monitored for display at the monitoring site.

1 Claim, 1 Drawing Figure

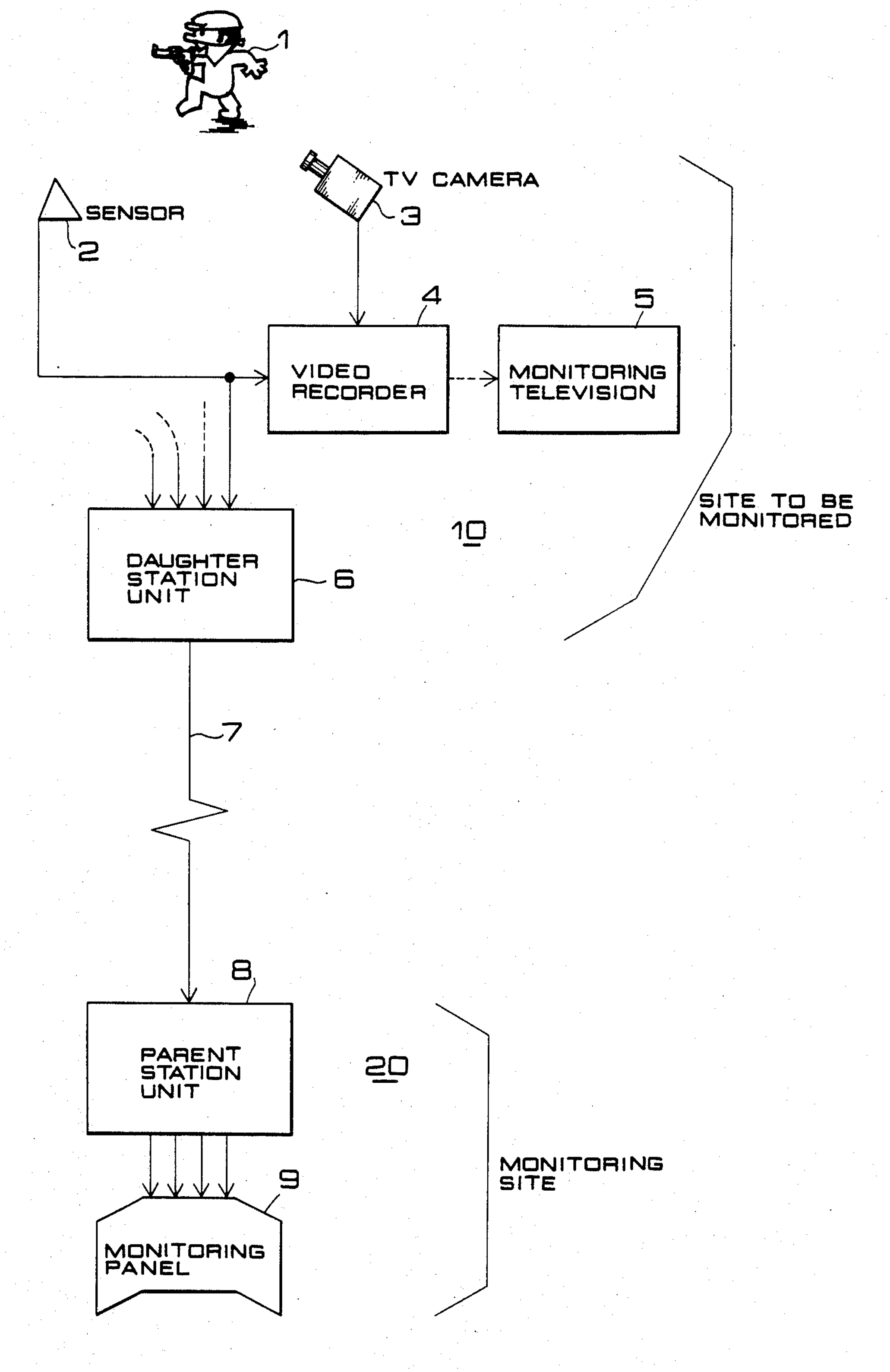
1
TV CAMERA
3
SENSOR
2
4
5
VIDEO RECORDER
MONITORING TELEVISION
SITE TO BE MONITORED
10
DAUGHTER STATION UNIT
6
7
8
PARENT STATION UNIT
20
9
MONITORING SITE
MONITORING PANEL

SECURITY SYSTEM INCLUDING A DAUGHTER STATION FOR MONITORING AN AREA AND A REMOTE PARENT STATION CONNECTED THERETO

BACKGROUND OF THE INVENTION

1. Field of the Invention

The present invention relates to a security system for preventing trespassing of an unauthorized person, vehicle, animal, or the like upon a specific region, and more particularly, to a security system which is more effectively operated in the case where the specific region or a site is monitored by a daughter or remote station of a so-called remote monitoring system.

2. Description of the Prior Art

The security system so far known is such a one as will, upon its sensor's sensing foreign matter, give an alarm at the locality by a siren or the like. With the development of the industrial television system, however, another system has also come to be used that will take, by means of a television camera, images of the state of affairs at the site and transmit the images taken to a monitoring site where the camera images are to be monitored by means of a monitoring television.

But there are some problems in the above described television monitoring system. That is, a system for transmitting such images needs a larger frequency band width, and if the monitoring site is remote from the site to be monitored by several hundred meters or more, special equipment and means for transmission becomes, in general, necessary. Therefore, the system becomes considerably expensive, or, in some cases, even becomes impracticable from the point of view of the means for transmission.

SUMMARY OF THE INVENTION

The present invention is contemplated to solve the above mentioned problems. Therefore, the principal object of the invention is to provided an inexpensive and economical security system which requires no special transmission path.

According to the security system of the present invention, the site to be monitored, which is under constant monitoring by a remote monitoring system, is provided with a sensor for sensing foreign matter such as man, animal, and vehicle, a television camera for taking the image of the state of affairs at the site to be monitored, and a video recorder for recording the image taken by the television camera, in which the sensor is adapted to output a signal when it senses foreign matter thereby to start the video recorder recording the image taken by the television camera as well as to notify, via the remote monitoring system, the monitoring site of the fact a trespass has occurred.

The observer at the monitoring site in the present invention will, when notified via the remote monitoring system of the trespass of foreign matter upon the site to be monitored, visit the site and find out what the foreign matter that made the trespass was by replaying and analyzing the contents of the record made by the video recorder by means of the monitoring television.

BRIEF DESCRIPTION OF THE DRAWING

The accompanying single figure schematically shows a security system embodying the present invention.

DETAILED DESCRIPTION OF THE PREFERRED EMBODIMENT

The accompanying drawing is a block diagram showing a preferred embodiment of the present invention, wherein 10 denotes a site to be monitored where a daughter or remote station is installed and 20 denotes a monitoring site where a parent or master station is installed. In the site 10 to be monitored, 1 denotes a trespasser as foreign matter, 2 denotes a sensor for sensing the foreign matter within a predetermined region, 3 denotes a television camera for taking the scene of the state of affairs at the site to be monitored, 4 denotes a video recorder for recording the image of the scene taken by the television camera, 5 denotes a monitoring television for playing back the recorded contents by the video recorder 4 for analysis, and 6 denotes a daughter station unit of a remote monitoring apparatus. And, in the monitoring site 20 which is connected with the site to be monitored through a signal transmission path 7, 8 denotes a parent station unit of the remote monitoring apparatus and 9 denotes a monitoring panel.

In the security system structured as above, the daughter station unit 6 of the remote monitoring apparatus constantly converts conditions of various items at the site to be monitored (for example, opened or closed condition of a switch, actuated or unactuated condition of a fire sensor, etc.) which are sensed by a sensor or sensors (not shown) other than the sensor 2 into temporarily serialized codes and transmits the codes to the parent station unit 8 at the monitoring site through the signal transmission path 7. The parent station unit 8 arranges the received codes back to parallel data and displays the conditions of the respective items on the monitoring panel 9.

Now, if a trespasser appears on the site 10 to be monitored, the sensor 2 will sense this and report it to the daughter station unit 6 of the remote monitoring apparatus, and simultaneously starts up the video recorder 4 to record the image of the scene from the television camera 3. The daughter station unit 6 of the remote monitoring apparatus will transmit the sensed signal from the sensor 2 to the parent station unit 8 as one of the sensed items to be displayed on the monitoring panel 9.

The observer at the monitoring site 20 notified by the display on the monitoring panel 9 of the trespass of foreign matter upon the site 10 to be monitored will visit this site. After arrival at the site, even if the trespasser 1 has already disappeared from the site, the observer can find out what the trespasser was by playing back and analyzing the contents of the record made by the video recorder 4 by means of the monitoring television 5.

The security system of the invention is, as so far described, arranged so that the video recorder is started by the signal which is output by the sensor when the same senses a trespass of foreign matter upon the site to be monitored, whereby the image of the scene taken by the television camera is recorded and, at the same time, the trespass of the foreign matter is reported to the monitoring site. Thus, the present invention produces such effects that the security system needs no special transmission path and the same can be provided at low cost and economically.

What is claimed is:

1. In a security system including a daughter station unit installed at a site to be monitored for trespass upon said site and a parent station unit installed at a monitoring site remote from the daughter station unit and connected with the daughter station unit through a signal transmission path, said system comprising:

a sensor installed at the site to be monitored for sensing a trespass upon a predetermined region and outputting a signal;

a television camera positioned to produce an image of said predetermined region, said camera being started by said signal;

a video recorder at the site to be monitored connected to said television camera for recording the image produced by said television camera;

means responsive to said signal output by said sensor for transmitting said signal from said daughter station unit to said parent station unit through said signal transmission path; and means at said parent station for producing a display, upon receipt of said signal in response to said received signal;

said system further comprising a plurality of sensors for monitoring a plurality of different conditions and said daughter station unit including means for converting the outputs of said plurality of sensors and that of said sensor for sensing a trespass into serialized codes; and means for transmitting said serialized codes over said signal transmission path to said parent station unit;

said system further comprising a monitoring panel connected with said parent station unit for displaying the output of each of said sensors;

said signal transmission path being capable of transmitting only the signals from said plurality of sensors and from said sensor for sensing a trespass.

* * * * *